United States Patent
Wolf et al.

(10) Patent No.: US 10,764,388 B2
(45) Date of Patent: Sep. 1, 2020

(54) APPARATUS AND METHODS FOR REDUCED SWITCHING DELAYS IN A CONTENT DISTRIBUTION NETWORK

(71) Applicant: Time Warner Cable Enterprises LLC, New York, NY (US)

(72) Inventors: Ethan Wolf, Aurora, CO (US); Jason Gaedtke, Evergreen, CO (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 467 days.

(21) Appl. No.: 15/043,230

(22) Filed: Feb. 12, 2016

(65) Prior Publication Data

US 2016/0248874 A1    Aug. 25, 2016

Related U.S. Application Data

(62) Division of application No. 13/213,817, filed on Aug. 19, 2011, now Pat. No. 9,264,508.

(51) Int. Cl.
*G06F 15/16* (2006.01)
*H04L 29/08* (2006.01)
(Continued)

(52) U.S. Cl.
CPC ..... *H04L 67/2842* (2013.01); *H04N 21/2183* (2013.01); *H04N 21/251* (2013.01);
(Continued)

(58) Field of Classification Search
CPC ............ H04L 67/2842; H04N 21/4331; H04N 21/2183; H04N 21/4384; H04N 21/25891;
(Continued)

(56) References Cited

U.S. PATENT DOCUMENTS 6,275,618 B1    8/2001   Kodama
7,031,348 B1    4/2006   Gazit
(Continued)

FOREIGN PATENT DOCUMENTS

| JP | 2005130087 A | 5/2005 |
| JP | 2007060178 A | 3/2007 |
| JP | 2007324814 A | 12/2007 |

OTHER PUBLICATIONS

Cho C., et al., "Improvement of Channel Zapping Time in IPTV Services using the Adjacent Groups Join-leave Method," Advanced Communication Technology, 2004. The 6th International Confere Nce on Phoenix Park, 2004, vol. 2 (9), pp. 971-975.

*Primary Examiner* — Hee Soo Kim
(74) *Attorney, Agent, or Firm* — Gazdzinski & Associates, PC

(57) ABSTRACT

Apparatus and methods for providing reduced channel switching delays in a content distribution network. In one embodiment, switching delays are reduced by caching background content at reduced quality and/or resolution. A manager entity is provided which manages which, and how many, background channels are cached. Additionally, the manager entity may classify each device in the network according a status thereof. When a particular device is in one status or mode, background content is cached; however, when the device is in another status or mode, it will no longer require background content caching. The provision of background content and the determination of a status may be based on for example the user or device behavior and patterns, user preferences or favorites, bandwidth availability, time of day, subscription level, type of program, recentness of channel change requests on the device (or associated devices), etc.

22 Claims, 7 Drawing Sheets

(51) Int. Cl.
  *H04N 21/438* (2011.01)
  *H04N 21/2183* (2011.01)
  *H04N 21/25* (2011.01)
  *H04N 21/258* (2011.01)
  *H04N 21/61* (2011.01)
  *H04N 21/643* (2011.01)
  *H04N 21/433* (2011.01)
  *H04N 21/472* (2011.01)

(52) U.S. Cl.
  CPC ... *H04N 21/25891* (2013.01); *H04N 21/4331* (2013.01); *H04N 21/4384* (2013.01); *H04N 21/47202* (2013.01); *H04N 21/6125* (2013.01); *H04N 21/64322* (2013.01)

(58) Field of Classification Search
  CPC ......... H04N 21/6125; H04N 21/64322; H04N 21/251
  USPC ....................................................... 709/217
  See application file for complete search history.

(56) References Cited

U.S. PATENT DOCUMENTS

| | | | |
|---|---|---|---|
| 2002/0169926 A1 | 11/2002 | Pinckney et al. | |
| 2004/0103429 A1* | 5/2004 | Carlucci | H04N 7/163 725/32 |
| 2005/0138659 A1* | 6/2005 | Boccon-Gibod | H04H 60/27 725/58 |
| 2005/0240967 A1* | 10/2005 | Anderson | H04N 5/50 725/52 |
| 2007/0188665 A1* | 8/2007 | Watson | H04N 5/4401 348/731 |
| 2007/0250635 A1 | 10/2007 | Hamilton et al. | |
| 2008/0209499 A1* | 8/2008 | Ramesh | H04H 20/26 725/138 |
| 2009/0083279 A1* | 3/2009 | Hasek | H04L 67/2823 |
| 2009/0183196 A1 | 7/2009 | Chen et al. | |
| 2009/0282093 A1 | 11/2009 | Allard et al. | |
| 2009/0328090 A1 | 12/2009 | Randolph et al. | |
| 2010/0052925 A1 | 3/2010 | Hirabayashi et al. | |
| 2010/0080221 A1* | 4/2010 | Beatini | H04L 12/185 370/390 |
| 2010/0199318 A1 | 8/2010 | Chang et al. | |
| 2010/0293587 A1 | 11/2010 | Hain-Cohen Raziel et al. | |
| 2011/0106847 A1 | 5/2011 | Bocharov et al. | |
| 2011/0188439 A1* | 8/2011 | Mao | H04N 7/17318 370/312 |
| 2012/0192218 A1* | 7/2012 | Schwesinger | H04H 60/33 725/21 |
| 2013/0246643 A1 | 9/2013 | Luby et al. | |
| 2014/0109143 A1* | 4/2014 | Craner | H04N 21/4826 725/46 |
| 2015/0092837 A1 | 4/2015 | Chen et al. | |
| 2016/0191133 A1 | 6/2016 | Noh et al. | |
| 2017/0302959 A1 | 10/2017 | Samchuk et al. | |
| 2017/0366833 A1 | 12/2017 | Amidei et al. | |
| 2018/0131979 A1 | 5/2018 | Bayoumi et al. | |
| 2018/0213251 A1 | 7/2018 | Ikonin et al. | |
| 2018/0368122 A1 | 12/2018 | Kuchibhotla et al. | |
| 2019/0014337 A1 | 1/2019 | Skupin et al. | |
| 2019/0014363 A1 | 1/2019 | Skupin et al. | |
| 2019/0069038 A1 | 2/2019 | Phillips | |
| 2019/0166306 A1 | 5/2019 | Zen et al. | |

* cited by examiner

APPARATUS AND METHODS FOR REDUCED SWITCHING DELAYS IN A CONTENT DISTRIBUTION NETWORK

PRIORITY

This application is a divisional of and claims priority to co-owned and co-pending U.S. patent application Ser. No. 13/213,817 filed on Aug. 19, 2011 of the same title, issuing as U.S. Pat. No. 9,264,508 on Feb. 16, 2016, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The invention relates generally to the field of providing content to one or more users over a distribution network. In one exemplary aspect, the invention relates to methods and apparatus for reducing switching delays in a network providing IP packetized content to users.

2. Description of Related Technology

The provision of content to a plurality of subscribers in a content distribution network is well known in the prior art. In a typical configuration, the content is distributed to the subscribers devices over any number of different topologies including for example: (i) Hybrid Fiber Coaxial (HFC) network, which may include e.g., dense wave division multiplexed (DWDM) optical portions, coaxial cable portions, and other types of bearer media; (ii) satellite network (e.g., from an orbital entity to a user's STB via a satellite dish); (iii) optical fiber distribution networks such as e.g., "Fiber to the X" or FTTx (which may include for example FTTH, FTTC, FTTN, and FTTB variants thereof); (iv) Hybrid Fiber/copper or "HFCu" networks (e.g., a fiber-optic distribution network, with node or last-mile delivery being over installed POTS/PSTN phone wiring or CAT-5 cabling); (v) microwave/millimeter wave systems; etc.

Various types of content delivery services are utilized in providing content to subscribers. For example, certain content may be provided according to a broadcast schedule (aka "linear" content). Content may also be provided on-demand (such as via video on-demand or VOD, free video on-demand, near video on-demand, etc.). Content may also be provided to users from a recording device located at a user premises (such as via a DVR) or elsewhere (such as via a personal video recorder or network personal video recorder disposed at a network location) or via a "startover" paradigm, which also affords the user increased control over the playback of the content ("non-linear").

Just as different varieties of content delivery services have evolved over time, several different network architectures have also evolved for deploying these services. These architectures range from fully centralized (e.g., using one or more centralized servers to provide content to all consumers) to fully distributed (e.g., multiple copies of content distributed on servers very close to the customer premises, at the "edge" of the distribution network), as well as various other configurations. Some distribution architectures (e.g., HFC cable, HFCu, etc.) consist of optical fiber towards the "core" of the network, which is in data communication with a different medium (coaxial cable radio frequency, copper POTS/PSTN wiring) distribution networks towards the edge.

Satellite networks similarly use a radio frequency physical layer (i.e., satellite transceiver and associated settop box and satellite dish located at each of the consumer's premises) to transmit digital television and data signals.

"WiMAX" technology, specified in inter alia IEEE-Std. 802.16e, offers high data rate, wireless access and content delivery to network subscribers at literally any location, fixed or mobile. This technology ostensibly provides MSOs and other service providers a flexible and high-bandwidth means of delivering content to their subscribers, and is especially well suited to both fixed and mobility applications due to its comparatively long range (much greater than WLAN technologies such as Wi-Fi), and wireless (air) interface.

Other systems and methods may also be used for delivering media content to a plurality of subscribers. For example, so-called "Internet Protocol Television" or "IPTV" is a system through which services are delivered to subscribers using the architecture and networking methods of an Internet Protocol Suite over a packet-switched network infrastructure (such as e.g., the Internet and broadband Internet access networks), instead of being delivered through traditional radio frequency broadcast, satellite signal, or cable television (CATV) formats. These services may include, for example, Live TV, Video On-Demand (VOD), and Interactive TV (iTV). IPTV delivers services (including video, audio, text, graphics, data, and control signals) across an access agnostic, packet switched network that employs the IP protocol. IPTV is managed in a way so as to provide the required level of quality of service (QoS), quality of experience (QoE), security, interactivity, and reliability via intelligent terminals such as PCs, STBs, handhelds, TV, and other terminals. IPTV service is usually delivered over a complex and heavy "walled garden" network, which is carefully engineered to ensure sufficient bandwidth for delivery of vast amounts of multicast video traffic.

IPTV uses standard networking protocols for the delivery of content. This is accomplished by using consumer devices having broadband Internet connections for video streaming. Home networks based on standards such as "next generation" home network technology can be used to deliver IPTV content to subscriber devices in a home.

So-called "Internet TV", on the other hand, generally refers to transport streams sent over IP networks (normally the Internet) from outside the network (e.g., cable, HFCu, satellite, etc.) that connects to the user's premises. An Internet TV provider has no control over the final delivery, and so broadcasts on a "best effort" basis, notably without QoS requirements.

There is also a growing effort to standardize the use of the 3GPP IP Multimedia System (IMS) as an architecture for supporting IPTV services in carriers networks, in order to provide both voice and IPTV services over the same core infrastructure. IMS-based IPTV may be adapted to be compliant with the IPTV solutions specifications issued by many IPTV standards development organizations (SDOs), such as, e.g., Open IPTV Forum, ETSI-TISPAN, ITU-T, etc.

Extant Internet TV and IPTV solutions (regardless of bearer medium) lack several fundamental capabilities now being demanded by users, including a desire for a user experience which mimics that of traditional broadcast systems in terms of providing swift and smooth channel changing or so-called "channel surfing" capabilities in a bandwidth and network efficient way.

One improved architecture and associated methods for packetized (e.g., IP) content delivery are described co-owned U.S. application Ser. No. 12/841,906 filed on Jul. 22, 2010 and entitled "APPARATUS AND METHODS FOR PACKETIZED CONTENT DELIVERY OVER A BANDWIDTH-EFFICIENT NETWORK", now U.S. Pat. No. 8,997,136 issued on Mar. 31, 2015, which is incorporated herein by reference in its entirety. This architecture addresses the foregoing shortcomings of IPTV and Internet TV. However, the aforementioned smooth channel surfing capabilities are still desirable in such an architecture. Prior art methods for handling channel changes involving packetized content focus generally on providing a low resolution version of a requested program up to a point in time where the buffer of the viewer's set-top box is sufficiently filled. Then, the set-top box or the video server initiates a switch to the multicasted high resolution version of the channel. The low-resolution version ostensibly has the advantage of buffering faster, and hence reducing delay or latency to some degree. While these methods take into account viewers' tendency to traverse through the channels that lie between their current channel and their desired channel if the "distance" is short, they do not take into account other alternative tendencies of the viewer (for example, the viewers' tendency to jump to a distant channel).

In order to provide the ability to reduce delay in the prior art methods, certain channels may be selected for caching and therefore are pre-buffered and ready for immediate viewing. However, the prior art fails to provide a system which is able to determine when to provide cached background channels and when to cease the delivery and/or caching thereof.

Accordingly, what are needed are improved methods and apparatus to reduce latency in channel switching in a network, especially for networks carrying multiple channels of Internet protocol (IP) content. Such apparatus and methods would ideally provide efficient latency reduction during instances of channel surfing, and would predict times or instances where the user is likely to begin channel surfing.

SUMMARY OF THE INVENTION

The present invention addresses the foregoing needs by disclosing, inter alia, apparatus and methods for reducing switching delays in a network for providing content.

In a first aspect of the invention, a method for providing reduced channel changing latency in a content delivery network is disclosed. In one embodiment, the method includes: (i) receiving a request for first content from a user of a first device in communication with the network, (ii) providing the requested first content, (iii) caching a plurality of second content, a selection of the plurality of second content based at least in part on content selections by the user, (iv) receiving a request for one of the plurality of cached second content, (v) delivering the requested one of the cached second content, the delivery thereof comprising increasing at least one quality of the cached version thereof, and (vi) caching an updated plurality of second content. In one variant, the updated plurality of second content is based at least in part on the request for the one of the plurality of cached second content. The act of caching the second content may enable the delivery of the requested one of the cached second content to be performed substantially immediately after the request therefore is received.

In a second aspect of the invention, an apparatus for providing reduced channel changing latency in a content delivery network is disclosed. In one embodiment, the apparatus includes at least one network interface, a storage entity, and a processor configured to run at least one computer program thereon, the computer program. In one variant, the program is configured to, when executed: (i) access first information relating to a status of a user device in the network, (ii) when the user device has a first status, access second information relating to a user profile associated therewith, and (iii) utilize the second information to select one or more of a plurality of content for caching for the user device.

In a third aspect of the invention, a method for providing reduced channel changing latency in a content distribution network is disclosed. In one embodiment, the method includes: (i) providing first content to a user device in communication with the network, the user device having a first status with respect to its activity in the network, (ii) receiving from the user device a request for second content, (iii) determining whether to change the first status of the user device to a second status, (iv) providing the requested second content, and (v) when it is determined that the status of the user device is to be changed to the second status, caching third content, the caching of the third content comprising preparing the third content for delivery to the user with reduced latency.

In a fourth aspect of the invention, a method for providing bandwidth efficient reduced channel changing latency in a content delivery network is disclosed. In one embodiment, the method includes providing first content to a user device, caching second content, the cached second content able to be provided to the user device upon request therefore with reduced latency, and after a criterion for inactivity of the user device has been met, cease caching the second content.

In a fifth aspect of the invention, a computer readable apparatus is disclosed. The computer readable apparatus in one embodiment includes instructions which when executed reduced channel changing latency. In one embodiment latency is reduced by: (i) providing first content to a user device in communication with the network, the user device having a first status with respect to its activity in the network, (ii) receiving from the user device a request for second content, (iii) determining whether to change the first status of the user device to a second status, (iv) providing the requested second content, and (v) when it is determined that the status of the user device is to be changed to the second status, caching third content. In one variant, the caching of the third content comprises preparing the third content for delivery to the user with reduced latency.

In another embodiment, latency is reduced and bandwidth is conserved by providing first content to a user device, caching second content, the cached second content able to be provided to the user device upon request therefore with reduced latency, and after a criterion for inactivity of the user device has been met, cease caching the second content.

These and other aspects of the invention shall become apparent when considered in light of the disclosure provided herein.

Figure 1:
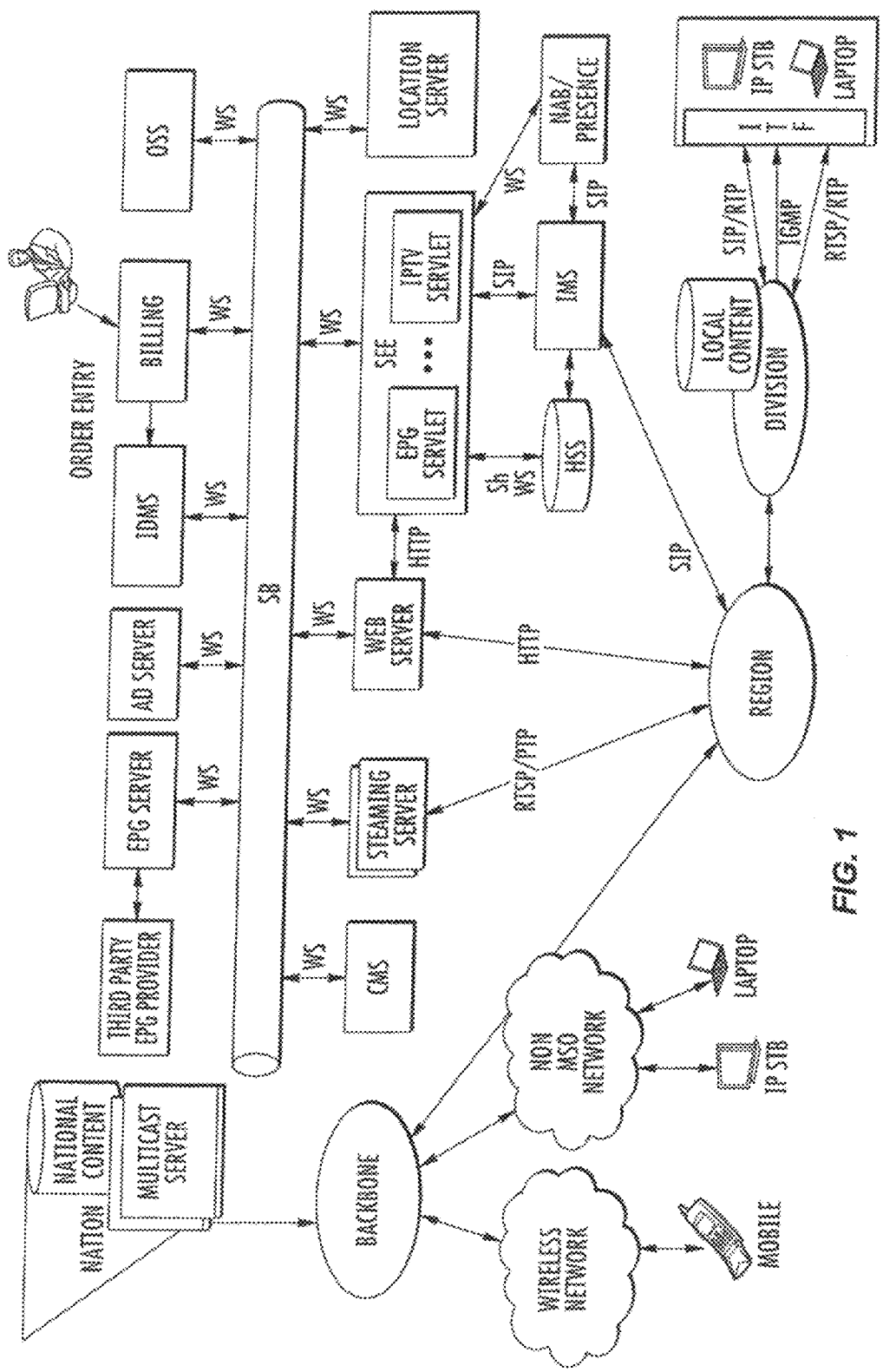
FIG. 1 is a functional block diagram illustrating one exemplary packetized content delivery network architecture useful with the present invention.

All Figures © Copyright 2010-2011 Time Warner Cable, Inc. All rights reserved.

DETAILED DESCRIPTION OF THE INVENTION

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (Real-Video, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The terms "Consumer Premises Equipment (CPE)" and "host device" refer without limitation to any type of electronic equipment located within a consumer's or user's premises and connected to a network. The term "host device" includes terminal devices that have access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "display" means any type of device adapted to display information, including without limitation CRTs, LCDs, TFTs, plasma displays, LEDs, incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, fiber to the home (FTTH), fiber to the curb (FTTC), satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers to either a group of service users (e.g. subscribers), or the resources shared by them in the form of for example entire cable RF signal, only the RF channels used to receive the service or otherwise treated as a single logical unit by the network for resource assignment.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "user interface" refers to, without limitation, any visual, graphical, tactile, audible, sensory, or other means of providing information to and/or receiving information from a user or other entity.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PC S/DCS, LTE/LTE-A, analog cellular, CDPD, satellite systems, millimeter wave or microwave systems, acoustic, and infrared (i.e., IrDA).

Overview

In one salient aspect, the present invention discloses methods and apparatus for providing reduced channel switching delays in a content delivery network. In one embodiment, the content delivery network is configured to carry Internet Protocol (IP) based content, and switching delays are reduced by caching "background" content (i.e., content which it is anticipated the viewer will request next) at reduced quality and/or resolution. The provided background content anticipates channel changes and, when a channel change is made to the background content, the selected content is immediately increased in quality and/or resolution, and provided to the requesting device along with updated background content.

In the exemplary implementation, the network includes a manager entity which manages which and how many background channels are cached. The provision of background content may be based on any number of different parameters or considerations, such as for example the user or device behavior and patterns, user preferences or "favorites", bandwidth considerations, time of day, and/or subscription level. Information or metadata enabling the manager entity to make such determinations is stored at a database accessible by the entity.

Additionally, the manager entity may classify each device in the network according a status thereof. When a particular device is in one status or mode, it will have appropriate background content cached therefore. However, when the device is in another status or mode, it will no longer have background content caching. The manager entity may make a determination of a status or mode of each device based on e.g., time of day, type of program, recentness of activity (i.e., channel change requests) on the device (or associated devices), bandwidth availability, or subscription level, or a combination of one or more of the foregoing.

In another embodiment, a gateway apparatus is provided for enabling content delivery to a plurality of legacy, or non-IP enabled devices. The gateway apparatus may be assigned a mode and/or a set of background channels applicable to all of the devices in communication therewith.

Detailed Description of Exemplary Embodiments

Exemplary embodiments of the apparatus and methods of the present invention are now described in detail. While these exemplary embodiments are described in the context of the aforementioned hybrid fiber coax (HFC) cable system architecture having an multiple systems operator (MSO), digital networking capability, IP delivery capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as well. Myriad other applications are possible.

It is further noted that while exemplary embodiments are described primarily in the context of a cable system with 6 MHz RF channels, the present invention is applicable to literally any network topology or paradigm, and any frequency/bandwidth or transport modality.

Also, while certain aspects are described primarily in the context of the well-known Internet Protocol (described in, inter alia, RFC 791 and 2460), it will be appreciated that the present invention may utilize other types of protocols (and in fact bearer networks to include other internets and intranets) to implement the described functionality.

Other features and advantages of the present invention will immediately be recognized by persons of ordinary skill in the art with reference to the attached drawings and detailed description of exemplary embodiments as given below.

Network

In a typical content delivery network configuration, content is provided from one or more content sources via one or more distribution servers to customer premises equipment (CPE). In one implementation, the distribution server(s), VOD servers and CPE(s) are connected via a bearer (e.g., HFC or satellite) network. A network headend (including various ones of the components listed above) may also be connected through a gateway or other such interface to unmanaged external internetworks such as the Internet.

The CPE as discussed herein includes any equipment in the "customers' premises" (or other locations, whether local or remote to the distribution server) that can be accessed by a distribution server. As will be discussed in greater detail below, in one embodiment, the CPE may include IP-enabled CPE, and a gateway or specially configured modem (e.g., DOCSIS cable or satellite modem).

A typical headend architecture may include a billing module, subscriber management system (SMS) and CPE configuration management module, cable-modem termination system (CMTS) and OOB system, as well as LAN(s) placing the various components in data communication with one another.

The exemplary headend architecture further includes a multiplexer-encrypter-modulator (MEM) coupled to the network and adapted to process or condition content for transmission over the network. Distribution servers (coupled to the LAN) may access the MEM and network via one or more file servers. Information is carried across multiple channels, thus, the headend is adapted to acquire the information for the carried channels from various sources. Typically, the channels being delivered from the headend to the CPE ("downstream") are multiplexed together in the headend and sent to neighborhood hubs via a variety of interposed network components.

Content (e.g., audio, video, data, files, etc.) is provided in each downstream (in-band) channel associated with the relevant service group. To communicate with the headend or intermediary node (e.g., hub server), the CPE may use the out-of-band (OOB) or DOCSIS channels and associated protocols.

An optical transport ring is also commonly utilized to distribute the dense wave-division multiplexed (DWDM) optical signals to each hub within the network in an efficient fashion.

In another embodiment, a so-called "broadcast switched architecture" (BSA), also known as "switched digital video" or "SDV", may be utilized. Switching architectures allow improved efficiency of bandwidth use for ordinary digital broadcast programs. Ideally, the subscriber is unaware of any difference between programs delivered using a switched network and ordinary streaming broadcast delivery.

Typically, in the BSA model, the headend contains switched broadcast control and media path functions which cooperate to control and feed, respectively, downstream or edge switching devices at the hub site which are used to selectively switch broadcast streams to various service groups. A BSA or SDV server is also disposed at the hub site, and implements functions related to switching and bandwidth conservation (in conjunction with a management entity at the headend).

Referring now to FIG. 1, an exemplary network architecture for providing optimized delivery of packetized content is shown. In addition to on-demand and broadcast content (e.g., video programming), the system of FIG. 1 also delivers Internet data services using the Internet protocol (IP), although other protocols and transport mechanisms of the type well known in the digital communication art may be substituted.

In one exemplary delivery paradigm MPEG-based video content is delivered, with the video transported to user PCs (or IP-based CPE) over the relevant transport (e.g., DOCSIS channels) comprising MPEG (or other video codec such as H.264 or AVC) over IP over MPEG That is, the higher layer MPEG- or other encoded content is encapsulated using an IP protocol, which then utilizes an MPEG packetization of the type well known in the art for delivery over the RF channels or other transport, such as via a multiplexed transport stream (MPTS). In this fashion, a parallel delivery mode to the normal broadcast delivery exists; e.g., in the cable paradigm, delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast. Delivery of the IP-encapsulated data may also occur over the non-DOCSIS QAMs.

The CPE 106 of the exemplary embodiment are each configured to monitor the particular assigned RF channel (such as via a port or socket ID/address, or other such mechanism) for IP packets intended for the subscriber premises/address that they serve.

The "packet optimized" delivery network is used for carriage of the packet content (e.g., IPTV content) when the request issues from an MSO network. As illustrated in FIG. 1, an IMS (IP Multimedia Subsystem) network with common control plane and service delivery platform (SDP), as described in U.S. Provisional Patent Application Ser. No. 61/256,903 entitled "METHODS AND APPARATUS FOR PACKETIZED CONTENT DELIVERY OVER A CONTENT DELIVERY NETWORK", incorporated herein by reference in its entirety may be utilized. Such a network provides significant enhancements in terms of common control of different services, implementation and management of content delivery sessions according to unicast or multicast models, quality-of-service (QoS) for IP-packetized content streams, service blending and "mashup", etc.; however, it is appreciated that the various features of the present invention are in no way limited to any of the foregoing architectures.

In the switched digital variant, the IP packets associated with Internet services are received by edge switch, and forwarded to the cable modem termination system (CMTS). The CMTS examines the packets, and forwards packets intended for the local network to the edge switch. Other packets are discarded or routed to another component.

The edge switch forwards the packets receive from the CMTS to the QAM modulator, which transmits the packets on one or more physical (QAM-modulated RF) channels to the CPE. The IP packets are typically transmitted on RF channels that are different than the RF channels used for the broadcast video and audio programming, although this is not a requirement. As noted above, the CPE are each configured to monitor the particular assigned RF channel (such as via a port or socket ID/address, or other such mechanism) for IP packets intended for the subscriber premises/address that they serve.

Packetized Content Delivery Network Architecture for Reducing Switching Delays

Figure 2:
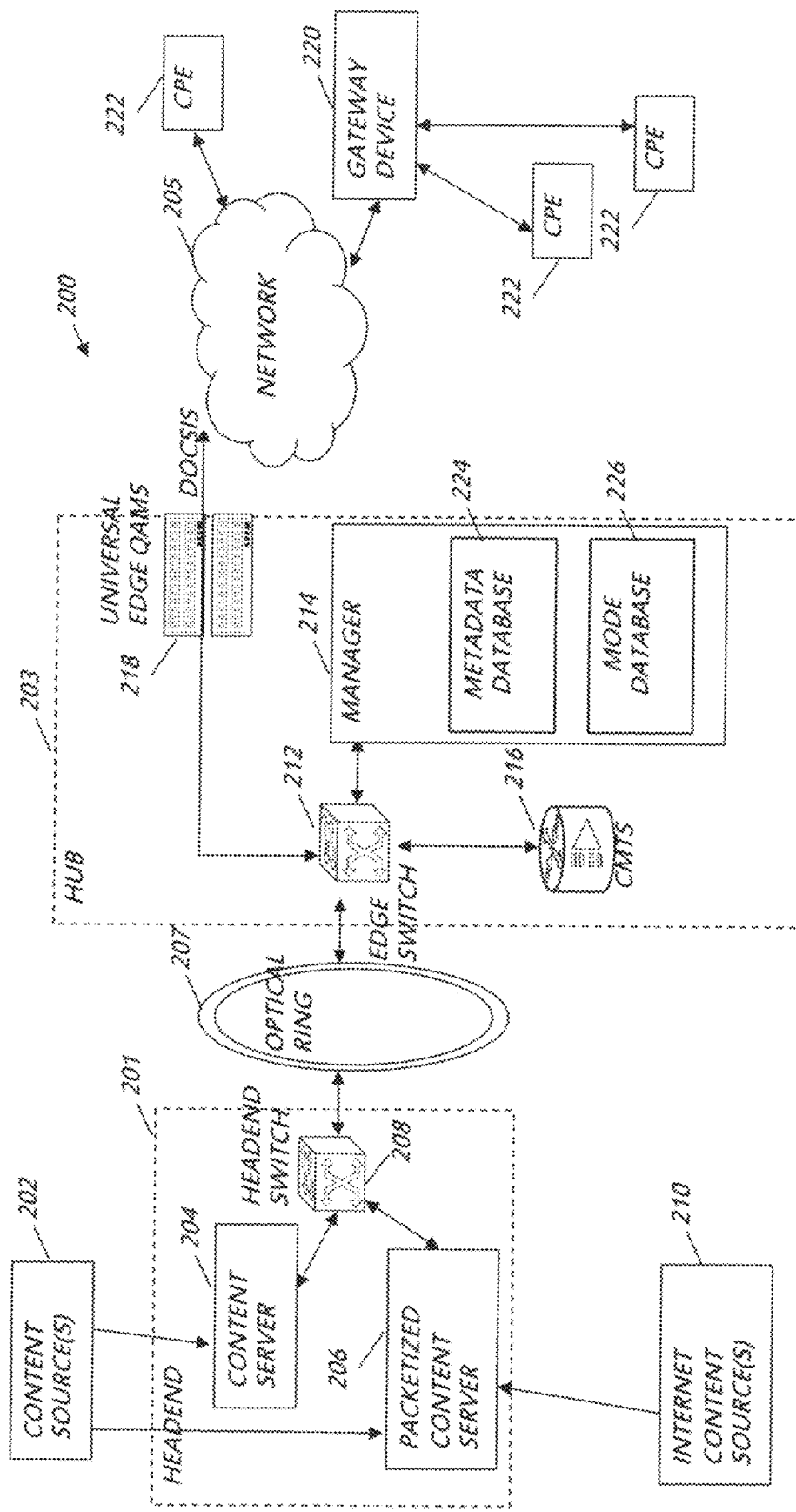
FIG. 2 is a functional block diagram illustrating another exemplary packetized content delivery network architecture useful with the present invention.

Referring now to FIG. 2, one exemplary embodiment of the architecture for providing reduced channel switching delays in the delivery of packetized content according to the present invention is illustrated. The network 200 generally comprises a local headend 201 in communication with at least one hub 203 via an optical ring 207. The distribution hub 203 is able to provide content to various user devices, CPE 222, and gateway devices 220, via a network 205.

Various content sources 202 are used to provide content to a content server 204. For example, content may be received from a local, regional, or network content library as discussed in co-owned U.S. application Ser. No. 12/841,906 filed on Jul. 22, 2010 and entitled "APPARATUS AND METHODS FOR PACKETIZED CONTENT DELIVERY OVER A BANDWIDTH-EFFICIENT NETWORK", previously incorporated herein by reference in its entirety. Alternatively, content may be received from linear analog or digital feeds, as well as third party content sources. Internet content sources 210 (such as e.g., a web server) provide internet content to a packetized content server 206. Other IP content may also be received at the packetized content server 206, such as voice over IP (VoIP) and/or IPTV content. Content may also be received from subscriber and non-subscriber devices (e.g., a PC or smartphone-originated user made video). In one embodiment, the functionality of both the content server 204 and packetized content server 206 may be integrated into a single server entity.

A central media server located in the headend 201 may be used as an installed backup to the hub media servers as (i) the primary source for lower demand services, and (ii) as the source of the real time, centrally encoded programs with PVR (personal video recorder) capabilities. By distributing the servers to the hub stations 203 as shown in FIG. 2, the size of the fiber transport network associated with delivering VOD services from the central headend media server is advantageously reduced. Hence, each user has access to several server ports located on at least two servers. Multiple paths and channels are available for content and data distribution to each user, assuring high system reliability and enhanced asset availability. Substantial cost benefits are derived from the reduced need for a large content distribution network, and the reduced storage capacity requirements for hub servers (by virtue of the hub servers having to store and distribute less content).

It will also be recognized that a heterogeneous or mixed server approach can be utilized consistent with the invention. For example, one server configuration or architecture may be used for servicing cable, satellite, HFCu, etc. subscriber CPE-based session requests, while a different configuration or architecture may be used for servicing mobile client requests. Similarly, the content servers 204, 206 can either be single-purpose/dedicated (e.g., where a given server is dedicated only to servicing certain types of requests), or alternatively multi-purpose (e.g., where a given server is capable of servicing requests from multiple different sources).

The network 200 of FIG. 2 may further include a legacy multiplexer/encrypter/modulator (MEM; not shown) coupled to the network 205 adapted to "condition" content for transmission over the network. In the present context, the content server 204 and packetized content server 206 may be coupled to the aforementioned LAN, thereby providing access to the MEM and network 205 via one or more file servers (not shown). The content server 204 and packetized content server 206 are coupled via the LAN to a headend switching device 208 such as an 802.3z Gigabit Ethernet (or incipient "10G") device. Video and audio content is multiplexed at the headend 201 and transmitted to the edge switch device 212 (which may also comprise an 802.3z Gigabit Ethernet device).

In one embodiment of the invention, both IP data content and IP-packetized audio/video content is delivered to a user via one or more universal edge QAM devices 218. According to this embodiment, all of the content is delivered on DOCSIS channels, which are received by a premises gateway 220 (described subsequently herein) and distributed to one or more CPE 222 in communication therewith. Alternatively, the CPE 222 may be configured to receive IP content directly without need of the gateway or other intermediary. As a complementary or back-up mechanism, audio/video content may also be provided in downstream (in-band) channels as discussed above; i.e., via traditional "video" in-band QAMs. In this fashion, a co-enabled digital set top box (DSTB) or other CPE could readily tune to the new (in-band) RF video QAM in the event that their IP session over the DOCSIS QAM is for some reason interrupted. This may even be accomplished via appropriate logic within the CPE (e.g., autonomously, or based on signaling received from the headend or other upstream entity, or even at direction of a user in the premises; e.g., by selecting an appropriate DSTB or other CPE function).

In the embodiment illustrated in FIG. 2, IP packetized content is provided to various user devices via the network 205. For example, content may be delivered to a gateway apparatus 220 which distributes content received thereat to one or more CPE 222 in communication with the apparatus 220.

In another variant, elements in both the headend and CPE 222 are specially adapted to utilize transmission infrastructure to transmit and receive both multiplexed wideband content and legacy content as is described in co-owned, co-pending U.S. patent application Ser. No. 11/013,671 filed on Dec. 15, 2004 and entitled "METHOD AND APPARATUS FOR WIDEBAND DISTRIBUTION OF CONTENT", which is incorporated by referenced herein in its entirety. As discussed therein, the CPE 222 or gateway 220 of this embodiment may be configured to contain multiple tuners (or a single wide-band tuner) which allow the device to receive the signals from all of the relevant physical carriers simultaneously. The carriers are demodulated, and channel-based decryption and basic demultiplexing (recombination) is performed. If multiplexed, the streams are then delivered to a transport demultiplexer which demultiplexes all of the streams resident within the statistical multiplex.

Methods and apparatus for the switched delivery of content may also be utilized consistent with the present invention. For example, only that content for which there is at least one request from a user device may be provided. In one embodiment, the methods and apparatus disclosed in co-owned U.S. patent application Ser. No. 09/956,688 filed on Sep. 20, 2001, entitled "TECHNIQUE FOR EFFECTIVELY PROVIDING PROGRAM MATERIAL IN A CABLE TELEVISION SYSTEM" and now U.S. Pat. No. 8,713,623 issued on Apr. 29, 2014, which is incorporated herein by reference in its entirety, may be utilized for providing "switched" delivery of the IP content. For example, a mechanism may be employed whereby the delivery of a session is based at least in part on logic to determine whether any users for the session are active; e.g., a multicast with no remaining "viewers" (or session participants) may be collapsed, and the bandwidth reclaimed.

In another variant, IP simulcast content and existing on-demand, voice, and broadcast content are all provided to the headend switch device 208 of FIG. 2. The headend switch 208 then provides the content to the optical ring 207 for provision to one or more distribution hubs 203. IP simulcast content is in one exemplary implementation retrieved from a plurality of content sources at an IPTV server.

The IP-packet content is transmitted to subscriber devices via the universal edge QAM 218 and the edge network 205. The IP video ("simulcast") content is presented to client devices capable of receiving content over the DOCSIS QAMs. For example, the aforementioned gateway device 220 (as well as an advanced CPE 222 such as an IP-enabled DSTB may receive the IP simulcast. Legacy CPE may receive content via the gateway device 220, or via an audio/video "back-up" MPEG transport stream as previously described.

It is further appreciated that content may be delivered to various Worldwide Interoperability for Microwave Access (WiMAX)-enabled mobile devices (e.g., PMD or non-legacy CPE) via a WiMAX distribution hub of the type now ubiquitous in the wireless arts. WiMAX is a wireless technology that provides high-throughput broadband connections over longer distances (as compared to short-range technologies such as WLAN, Bluetooth or PAN). WiMAX can be used for a number of applications, including "last mile" broadband connections, cellular backhaul, hotspot coverage, and high-speed enterprise connectivity, as well as broadband delivery to mobile devices.

Moreover, the aforementioned WiMAX technology may be used in conjunction with a WiMAX-enabled gateway (not shown) or CPE, such that content is delivered wirelessly to the gateway or CPE from the distribution hub, irrespective of the indigenous wired or optical distribution network infrastructure.

In the illustrated embodiment, the gateway device 220 serves as a gateway to the IP content for other client devices (such as other CPE 222 and PMD). The gateway device 220 may communicate with one or more connected CPE 222, as well as utilize Wi-Fi capabilities (where so equipped) to communicate wirelessly to other devices. It will also be recognized that the present invention may be configured with one or more short-range wireless links such as Bluetooth for lower bandwidth applications (or UWB/PAN for greater bandwidth applications).

In another embodiment, content received at a first user CPE 222 may be transmitted to CPE 222 of other premises in a peer-to-peer (P2P) fashion. For example, first content may be requested and received at a first CPE 222. Then, when a second CPE 222 in the same region or division requests the same content, the request may be examined by a headend entity (not shown), or the gateway 220 acting as a peer proxy, to determine that the requesting second device CPE 222 is entitled to receive the content and that the content is available at the first CPE 222. The headend entity directs a peer-to-peer communication to be established between the authorized second CPE 222 and the CPE 222 having the requested content. It is appreciated that while described herein in the context of a single CPE 222 providing content to a second CPE 222, several CPE 222 having the content thereon may be contacted for simultaneous delivery of the content to one or more second CPE 222. In one such implementation, the peer-to-peer communication methods and apparatus disclosed in co-owned U.S. patent application Ser. No. 11/726,095 entitled "METHOD AND APPARATUS FOR CONTENT DELIVERY AND REPLACEMENT IN A NETWORK" filed Mar. 20, 2007, which is incorporated herein by reference in its entirety, may be utilized in conjunction with the present invention. As discussed therein, these P2P methods and apparatus also advantageously improve the "robustness" or capability of the network with respect to ensuring that subscribers or other users can receive and access desired content when they want, as well as seamlessly repairing or reconstituting damaged or missed portions of that content (including even an entire streamed program, broadcast or download).

It is still further appreciated that the delivery of content may include delivery from an "off-net" distribution hub (not shown) to another network (not shown), not associated with the MSO. In this embodiment, a requesting device (such as CPE 222 or gateway 220) may request content from a local headend 201 which is transferred over both MSO-maintained ("on-net") and "off-net" networks advantageously.

In another aspect of the invention, a so-called "decision" engine may be disposed at e.g., the manager 214, as a separate entity at the hub 203 or headend 201, the CPE 106, or other location (e.g., rendered as one or more computer programs disposed thereon). This engine comprises, in an exemplary embodiment, one or more software routines adapted to control bandwidth allocation for caching background content in order to achieve one or more goals relating to operations or business (e.g., profit or revenue or subscriber retention). Included within these goals are network optimization and reliability goals, increased maintenance intervals, increased subscriber or user satisfaction/longevity, increased subscription base, higher profit (e.g., from increased advertising revenues, more subscriber "views" of given content, greater flexibility in the types and locations of platforms from which the subscriber may access content, and so forth).

These decision rules may comprise a separate entity or process, and may also be fully integrated within other processing entities (such as the applications running on the aforementioned entities), and controlled via e.g., a GUI displayed on a device connected to the relevant server, network entity (such as the manager 214), or even CPE. In effect, the rules engine comprises a supervisory entity which monitors and selectively controls content access and delivery operation (including allocation of bandwidth and other resources to background channels) at a higher level, so as to implement desired operational or business rules.

For example, the relevant entity may invoke certain operational protocols or decision processes based on information/inputs or requests received from the CPE (including e.g., priority assignments), conditions existing within the network (such as limited bandwidth availability), demographic data, geographic data, user and/or device profile information, etc. However, these processes may not always be compatible with higher-level business or operational goals, such as maximizing profit or system reliability. Hence, when imposed, the business/operational rules can be used to dynamically (or manually) control access to and delivery of content (including background content).

The decision rules may be, e.g., operational or business-oriented in nature, and may also be applied selectively in terms of time of day, duration, specific local areas, or even at the individual user level (e.g., via specific identification of the CPE or client device via a tuner identity (tuner ID), IP address, MAC address, or the like). In another variant, the application of these business or operational rules may occur according to a user-based login or "entitlements" profile of the type described at e.g., co-owned U.S. patent application Ser. No. 12/536,724 filed on Aug. 6, 2009 and entitled "SYSTEM AND METHOD FOR MANAGING ENTITLEMENTS TO DATA OVER A NETWORK", now U.S. Pat. No. 8,341,242 issued on Dec. 25, 2012, which is incorporated herein by reference in its entirety. In other words, when a particular subscriber logs into the system, it is immediately known whether the device on which the subscriber has logged on and/or subscriber him/herself are "high priority", and thus appropriate bandwidth allocation and background content caching rules may be utilized.

One decision rule implemented by the decision engine may comprise enabling and/or disabling background content caching according to a revenue- or profit-driven system. Utilizing this approach, an individual user or device (and/or content itself) may be selected as able or not able to be provided background caching based in part on the revenue or profit such delivery will bring to the MSO (for example based on the content source or subscription level of the user). For example, certain content which brings more revenue to the MSO may be prioritized over other, less profitable content, and thus be preferentially provided as background content. Additionally, lower tier subscribers may be selected as not receiving background content caching services, only premium subscribers being afforded reduced latency associated with simultaneously caching potentially relevant content.

Many other permutations of the foregoing system components, architectures and communication methods may also be used consistent with the present invention, as will be recognized by those of ordinary skill in the field.

During viewing, the user of a CPE 222 may request different programming; i.e., may request to change the channel. A delay associated with a channel change in the IP packetized content system is experienced due to, inter alia, the necessary buffering of the incoming newly requested programming. In one embodiment, however, this latency is reduced by caching a plurality of "background" streaming content for anticipated delivery. As will be described in greater detail subsequently herein, this background content generally comprises content which the system anticipates will be requested by the viewer. The background streaming content is pre-buffered and pre-loaded so that a user may make a seamless transition between currently received content and new content.

The background streams are, in one variant, cached at a lower resolution or quality until one of these is selected in a channel change event. Delivery of one of the background streams to the requesting viewer is delayed in one implementation to allow the system to increase the resolution and/or quality thereof prior to it being provided to the user device. The original stream may continue to be provided to the user during this delay period so that the switch to the new channel is seamless at full resolution and quality. Alternatively, the new stream may be provided at lower quality, and/or resolution immediately. The quality and/or resolution is increased as the new stream is being displayed, as it becomes available.

The background streams in one embodiment comprise unicast streams provided to the devices individually. When the user selects to view one of these, the unicast version is provided. Later, in the instance more than one device has requested a particular stream, these devices may be merged to a multicast of the programming content; e.g., via an IMGPv3 or similar protocol. In yet another variant, the unicasts comprise lower resolution or lower quality versions which are available initially for a channel change event, and which are replaced by a multicast high resolution or quality version. The user experiences effectively instantaneous channel changes with a short latency from receiving a lower quality stream to a higher quality stream.

The background streams selected to be cached for use by a particular device have some significance to that particular device. For instance, the background streams selected to be cached to a device (e.g., CPE) may comprise a pre-determined number of channels above and below a user's current channel. The pre-determined number of channels may be for example: (i) symmetric (such as three channels up and three channels down from the current channel), (ii) asymmetric (such as three channels up and only one channel down from a current channel), or (iii) based on a direction of movement (such as where the user is steadily moving up from a current channel, the background streams may progress upwards). In another variant, the caching is controlled at least in part based on the user's channel change rate. For example, content cached for a user who is rapidly flipping channels might be cached in greater number; e.g., three channels "up" for a slow rate of channel-hopping in the upward direction, or six channels cached for a fast channel-hop rate.

The number of background streams provided may vary as a function of available bandwidth. Hence, a manager entity 214 is provided to make decisions regarding background streams to be cached as potentially deliverable to any one CPE 222. In one implementation, the manager 214 collects data regarding channel change events at each CPE 222, and stores this information in a metadata database 224. The manager 214 may utilize this information to determine which streams to cache at any given time to the device(s) as background streams.

Background streams may thereby be targeted to the individual users and/or past activity on the device. For instance, background streams may be selected for caching based on historic usage metadata to determine popularity of the services and channels with respect to a given user. In one variant of the invention, a user profile is created. A recommendation engine such as for instance that discussed in co-owned U.S. Patent Application Publication No. 20100251305 filed on Mar. 30, 2009 and entitled "RECOMMENDATION ENGINE APPARATUS AND METHODS", now U.S. Pat. No. 9,215,423 issued on Dec. 15, 2015, which is incorporated herein by reference in its entirety may be utilized in conjunction with the present invention to provide and enhance user profiles. As discussed therein, a mechanism for particularly selecting content to align with a user's preferences (the latter which the viewer need not enter manually) is provided. The content delivered to the user (or chosen as background content) is compiled from various distinct sources, including, inter alia, DVR, broadcasts, VOD systems, start over systems, etc. The present invention provides a mechanism to learn (and unlearn) the user's preferences and which content they are likely to enjoy based on actions taken with regard to the content.

A user may also establish a "favorites list", or alternatively one may be generated based on the collected metadata. The "favorites" channels may be cached as background streams regardless of a user's currently viewed program. In one embodiment, the most recently viewed programs are used as a favorites list. Alternatively, the most often watched channels or programs (irrespective of temporal proximity) may be used as a/the basis for caching. The favorites list may be manually modified (such as by the user or a network operator) to include other channels than those previously watched. The favorites channels may also be "locked" by the user or operator (either individually or as a group) so that these may not be removed from the list and/or background streaming cache despite actual viewing thereof.

In another embodiment, the recommendation engine or other entity running at the manager 214 and in communication with the metadata database 224 may be utilized to generate an evolving list of channel favorites based on e.g., actual time spent viewing each channel. Thus, instead of merely caching surrounding channels or randomly chosen channels for background streaming, a histogram or other rendition illustrating what programs and/or channels the user statistically watch the most (such as by number of hours spent on that program/channel, or selected based on the one or more programs/channels which the user switches to or from most frequently).

The aforementioned implementations are advantageously able to dynamically update so that the favorites list takes into account viewership over a lifetime, as well as smaller time increments (such as hourly, daily, weekly, monthly, etc.).

Still further, the network entity which generates the favorites list (such as the manager 214) may be configured to "learn" a user's behavior, such as that within a given genre of content. For example, if a user is watching sports, the background stream caching decision may be based on the fact that this user is more likely to switch to another sports channel and therefore, one or more of the background channels may be other sports channels. The manager 214 may further "unlearn" user behavior in the instance the behavior is out of the ordinary for the user, or the user's interests change.

The user may also have two or more "contexts" that the manager entity 214 can learn or store related data for. These contexts may be temporal in nature (e.g., occur at certain times of the day, days of the week, time of the year, on holidays, etc.). For instance, a user may watch sports only on weekends, and watch other types of programming during the week. Or the user may watch sports every day during a certain period, and then one or more other types of programming before and after that period.

Depending on the amount of hardware resources available for caching (and/or bandwidth available if the background streams are delivered constantly), a less precise or broadened set of background streams may be cached and associated to each device. Similarly, when resources (or bandwidth) are constrained, fewer, more precisely targeted background streams may be cached.

The manager 214 may further utilize collected and stored metadata to determine a state or mode of each CPE 222. The state or mode of the CPE 222 is used as a basis for determining whether to continue caching background streams. For example, a CPE 222 in a "stagnant" mode (i.e., which remains in a resting state on a single channel for a predetermined or dynamically determined length of time) is much less likely to need background streams in anticipation of a channel change event. Therefore, when the manager 214 assigns a stagnant status to the CPE 222, background streams are no longer cached for the CPE 222. Devices which are in a "surfing" or "active" mode (i.e., which are actively engaged in channel changing events) are very likely to need background streams in anticipation of channel change events. Hence, assignment of an active status indicates that background streams should continue to be cached and provided to these devices.

Note that states or modes other than "active" or "stagnant" may also be utilized, so as to more finely capture viewer activity or characteristics (and hence allocate caching resources more precisely and efficiently). For example, a third mode of "combination" might be created, wherein the given user has appreciable periods of inactivity, but then has bursts of channel change activity (such as where they are interested in the substantive programming and hence stay on that programming between commercials, but then "flip channels" during the commercials to try to find something else of interest to watch during the commercials. In one model, the user may have "flip favorites"; i.e., a select group of say three or four channels which the user regularly accesses during the aforementioned commercials associated with the primary program.

It will also be recognized that certain types of content may be amenable or correlated to certain types of behavior. For example, a full-length feature with no commercial breaks, or musical content, would ostensibly be subject to less channel changing activity, since users would generally be more likely to leave the channel unchanged. In contrast, a 30 minute program with several commercial breaks may correlate to a much higher rate of channel change activity per unit time.

The manager 214 may be further adapted to predictively assign a status or mode to individual ones of the devices based on information known about a current stream. Information regarding the status of each of the devices in a node is held at a mode database 226.

For example, the manager 214 may be able to predict upcoming channel change activity based on the nearness of a commercial break in the currently viewed program. As a commercial break draws near, the manager 214 may elect to bring back in background channel caching automatically. Such a decision may further be based on the user's usage pattern and history for "channel surfing" during commercial breaks. A cue tone, marker, or other indicia or signal may alternatively indicate the beginning of a commercial break, and thus cause background content caching to begin in another embodiment.

Further, in the instance of commercial break-initiated channel changing, the manager 214 may require background caching of the original program, so that the user may return to the original program at the end of the commercial break (or anytime within the break).

It is further appreciated that the manager 214 may be configured to recognize patterns of behavior among the users and devices. For example, in a device which has been channel surfing for an extended period of time, the manager 214 may require a longer period of inactivity (i.e., no channel changes) before switching the device to a stagnant mode. Likewise, if a device has been stagnant for an extended period of time, a status change of the device to an active mode may be delayed based on time spent at the first new channel, and so forth (i.e., it may take longer to switch a device to active mode if it generally tends to be a stagnant viewer).

It is also appreciated that one or more of the functions of the manager 214 described above may be overridden based on information collected regarding a particular user or device. For example, a particular user or device may not be prone to channel changes during a commercial break, hence the manager 214 does not provide predictive background caching at commercial breaks for that device.

Methodology

Figure 3:
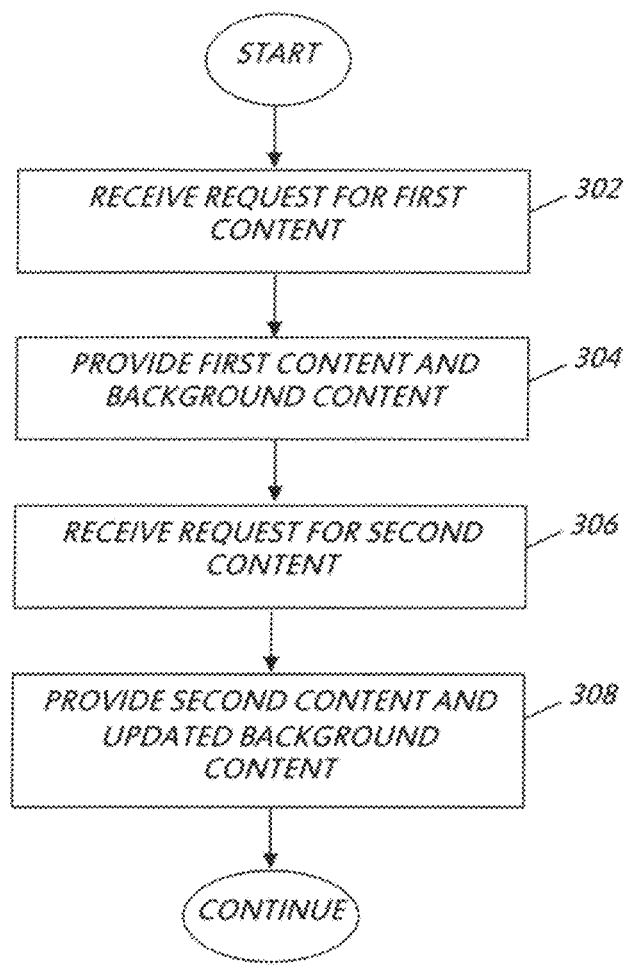
FIG. 3 is a flow diagram illustrating one embodiment of a method of providing reduced channel switching delays according to the present invention.

FIG. 3 illustrates one embodiment of a generalized methodology for providing reduced channel switching delays in a packetized content delivery network.

As shown, the method 300 generally comprises first receiving a request for first content (step 302). In response to the request, the first content and background content are provided per step 304. As noted above, the background content comprises content which the system determines has some likelihood of being selected by the user for viewing next. Although the background content is in the exemplary embodiment cached at a lower resolution and/or quality than the first content, bandwidth considerations may also be taken into account when determining whether and how many background channels to cache. For example, in some instances, bandwidth may not be sufficient to provide any background channels.

At step 306, a request for second content is received. It is appreciated that the second content may or may not be among the content provided or cached as background content in response to the request for the first content. If so, the second content is provided in increased quality (matching that of the provided first content). If the requested second content is not among the background content, some latency in its delivery may occur.

Additionally a step 308, necessary steps are taken to update the background content. Updating includes caching one or more additional background streams to replace the selected stream in the instance the user requests second content which was being cached in the background. Additionally, updating includes generating information relating to the users selection, and using this updated information (or metadata) to learn or reinforce an existing pattern of behavior for that user and/or device. For instance, the user's channel selection may: (i) cause the channel or program to be added to a favorites list, (ii) increase the priority of the channel as an existing favorite, (iii) indicate a pattern of behavior of the user incrementally climbing or decreasing in channel number, and/or (iv) indicate a pattern of behavior of the user often changing channels during a commercial break, at a program ending, etc.

Figure 4:
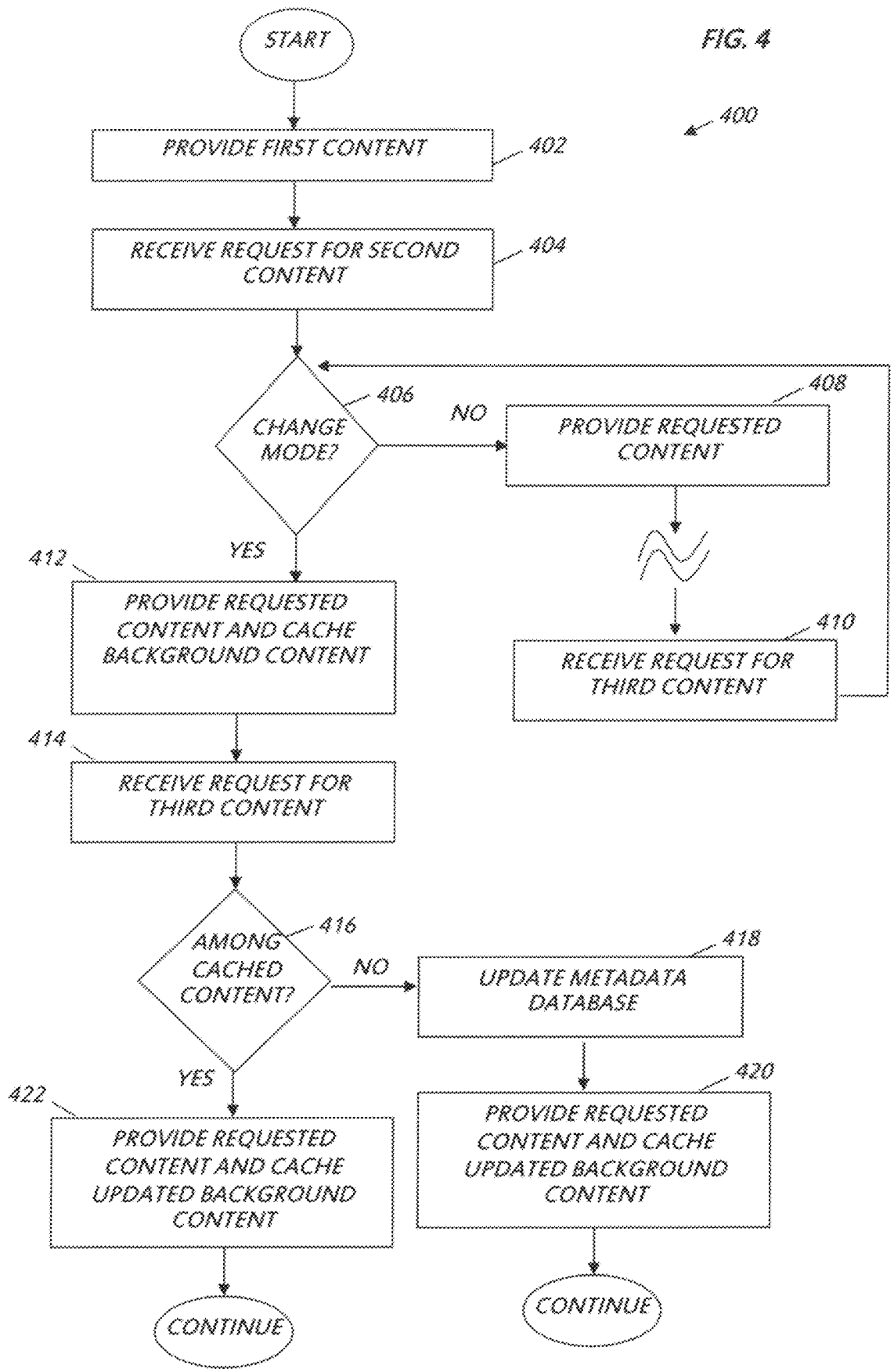
FIG. 4 is a flow diagram illustrating another embodiment of a method of providing reduced channel switching delays according to the present invention.

Referring now to FIG. 4, one embodiment of a method for providing IP packetized content with reduced channel switching delays is given.

As shown, the method 400 generally comprises providing first content to a device (such as a requesting CPE) per step 402. A request for second content originating from the device is then received per step 404. The request for second content is in the illustrated scenario associated with a channel change request.

Per step 406, it is determined whether the request for second content should trigger a state or mode change for the requesting device (see discussion of modes presented with respect to FIG. 2 above). The manager entity 214 makes this decision based on what is known about the device. For instance, if the device is not generally prone to "channel surfing", the manager 214 may allow the device to remain in "stagnant" state despite the request for additional content. Assume for the purpose of example that a user which is not generally known to be a "channel surfer" is tuned to Channel 10, then requests Channel 11. According to this example, because the device is not prone to many channel changes, the manager 214 may change keep the device in a "stagnant" mode despite that other devices (i.e., "channel surfers") would have been put in an active state upon the request for a channel change.

If a mode of the apparatus is not changed, the requested second content is provided to the device per step 408. If, after some time, a request for third content is received (step 410), the method repeats at step 406, wherein a determination is again made as to whether the mode of the device should be changed.

If a mode of the apparatus is changed per step 406, then the requested content is provided and additional background content is cached per step 412. As noted above, the additional background content may be selected as for example: (i) content which is immediately above and below (in channel sequence) the currently viewed content channel (either symmetrically or asymmetrically), (ii) content from a "favorites" list (generated manually, as a function of the most recently viewed programs, or by a learning engine), and/or (iii) other content identified as being potentially relevant to that device or user, group of devices or users, or to all devices or users.

Assume for example that a user is tuned to Channel 10, and then requests Channel 11. The manager 214 in this instance may change the mode associated with the apparatus to "active", and cache background content for Channels 12, 13, 14, etc. Alternatively, if the user is tune to Channel 10, and then requests Channel 23, which is known to be a "favorite" for this user, the manager 214 will instead select the other favorite channels as background content. It is further appreciated that the manager 214 may select a mix or sequence of favorite, incremental and/or other identified programs as cached background streams.

At step 414 of the method 400, a request for third content is received. Again, the request in this illustration is associated with the user changing channels from the second to the requested third content. The manager 214 next determines whether the third requested content is among the content cached as background streams (step 416). This information is useful in determining the effectiveness of the selection of background streams.

If the requested third content is not among the content provided in the background, per step 418, the manager 214 updates the metadata database to indicate that a request was made for content outside of the predicted pattern of behavior. The metadata updates are used to generate updated background content which is then cached and the requested content is provided to the user (step 420). For example, the user's choice of content not within the previously cached background content may indicate to the manager 214 that content other than the immediate channels up and/or down from a current channel should be selected for this particular user, and instead "favorites" based background caching should be used.

If the requested third content is among the content provided in the background, this lower quality content is optionally increased in resolution and/or quality, and provided to the user per step 422. Additionally, the background content cache is updated. Updates to the background content in this instance may include for example caching one additional content stream in place of the selected one of the background streams which was requested and is now being provided. The updated background content may track the user's patterns of behavior. For example, if the requested second and third content are channels which are incrementally larger or smaller, the background stream updates to include the next incrementally larger or smaller channel.

Additionally, a lesser utilized or previously viewed favorite channel may be brought in as background content as the user continues to request content (i.e., as the user "channel hops"). Suppose for example that a user's favorites include Channels 10, 12, 18, 22, 25, 31, 33, 39, 40, 45, 52, and 55. A user may be provided Channel 10, with Channels 12, 22, 33, and 45 cached as background content. When the user selects to change to Channel 22, Channel 10 may be cached in the background, or alternatively, any one of the remaining favorites may be cached.

Although the foregoing are discussed in terms of a request for content triggering mode changes and delivery of background content, it is appreciated that in one embodiment, the mode change and delivery of background content may be performed prior to a request for second and/or third content; e.g., may be performed in anticipation of such a request, such as at (or ahead of) a commercial break, program ending, etc.

Figure 5:
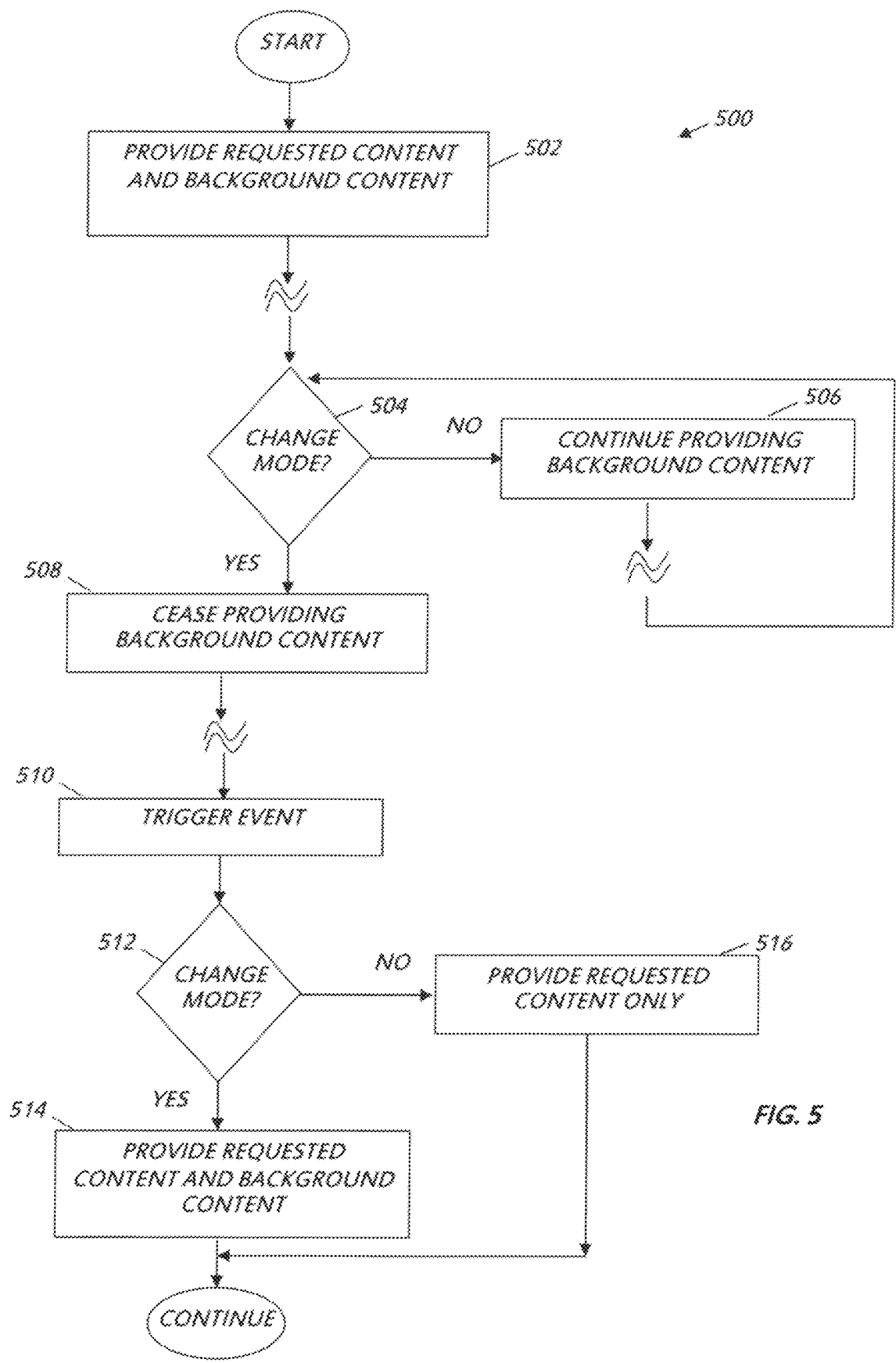
FIG. 5 is a flow diagram illustrating another one embodiment of a method of providing reduced channel switching delays according to the present invention.

Referring now to FIG. 5, one embodiment of a method for providing IP packetized content with reduced channel switching delays is described. As shown, per step 502, requested content is provided to the user device and background content is cached. In the absence of user activity, after a predetermined length of time, the manager 214 is tasked with determining whether the mode or status of the device should be updated to reflect that the user is no longer in need of background content caching (i.e., is not likely to begin channel surfing or changing channels in the near future) per step 504. The determination of whether to place a device in "stagnant" mode is based in the exemplary embodiment on what is known about a particular user (such as whether the user of the device often channel surfs, is often stagnant, etc.), what is known about the stream (such as whether a commercial break is upcoming, whether a program is ending, etc.), and/or current resource allocation (such as current available bandwidth, predicted bandwidth requirements, etc.).

If the manager 214 elects to change the mode of the device to a stagnant mode, the system may cease caching background content per step 508. Hence, the mode change to "stagnant" in this instance will conserve network bandwidth and other resources which would otherwise be necessary to support caching. If the manager 214 elects not to change the device mode to stagnant (i.e., leave the device in active mode), then per step 506 the system will continue providing the originally requested content and keep the cache of the additional background content.

When the manager 214 elects to change modes to place a device in stagnant mode, after a period of time, a trigger event may occur (step 510) which causes the manager 214 to again evaluate whether the change the mode of the device (step 512). The trigger event may be for example a request for new content, a program end or commercial break cue, or some other network or user-generated trigger (e.g., power-up or power-down of the CPE). As noted above, the decision of whether to change a mode of the device may be based on various factors including inter alia the time between channel change requests, patterns of behavior of the user or device, and/or bandwidth availability.

In this instance, if the mode is not changed, the device continues to receive only the requested programming without any background streams being cached (step 516). If however, the device mode is changed to active, the requested content is provided and background content is cached (step 514).

Manager

Figure 6:
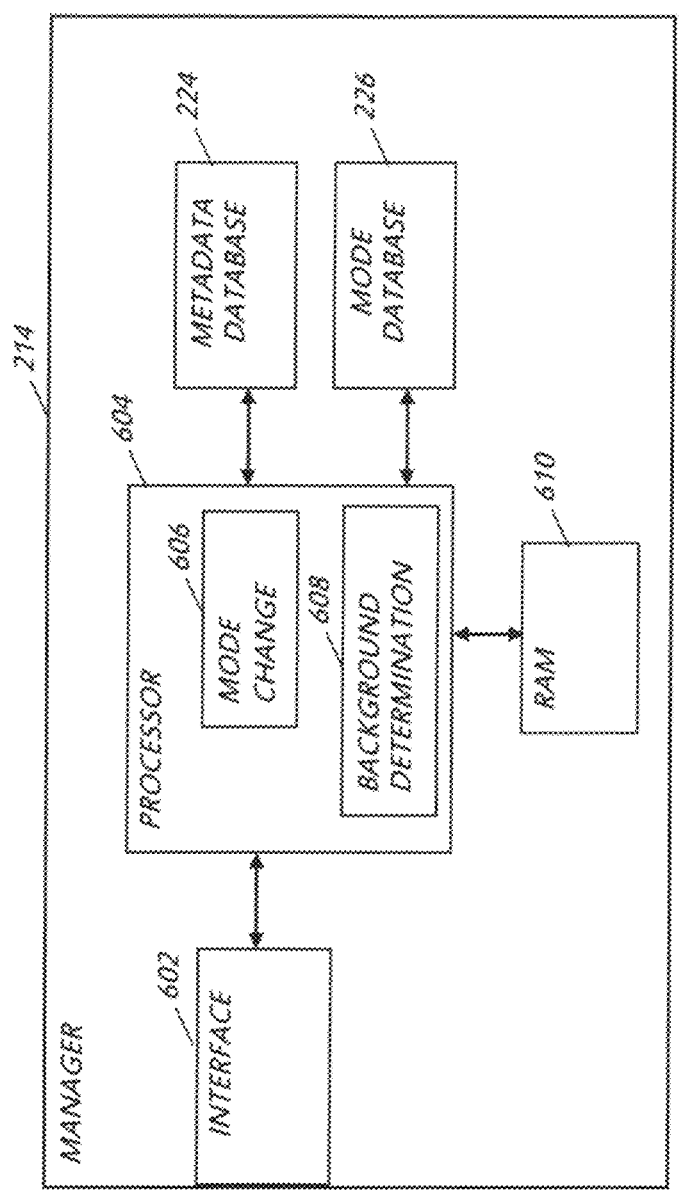
FIG. 6 is a functional block diagram illustrating one embodiment of a manager according to the present invention.

FIG. 6 illustrates an exemplary embodiment of a manager entity 214 according to the invention. As illustrated, the manager 214 generally comprises at least one interface 602 for communication within the host network infrastructure, a processor 604, and associated storage 610.

The processor 604 in the illustrated embodiment is configured to run at least a mode change application 606 and a background caching determination application 608 thereon (which may be integrated into a common application or program if desired). Information useful in determining mode changes and/or stream determinations is stored in a metadata database 224 and/or a mode database 226.

In the illustrated embodiment, the mode change application 606 is responsible for determining mode; e.g., whether a device should be placed in a stagnant or active mode. As discussed with respect to the methods of FIGS. 3-5 above, the mode determination may be based at least partly on what is known about the program. For example, if it is known that the currently viewed program is a full length movie with limited or no commercials, channel changes may be surmised to be less frequent, and thus a device may be placed in stagnant mode. If it is known that the program has many commercial breaks, then the mode change application 606 may determine to keep the device in active mode.

The determination may also be based on time of day. For instance, the mode change application 606 may be configured to elect to keep most devices in stagnant mode for a certain time period, such as e.g., 12 am-5 am (local time for the device), in that either (i) the device will not be actively used during that period (i.e., the user is asleep), or (ii) even if being "actively" used (i.e., the CPE is turned on), the user may not be actively watching it, such as due to falling asleep with the CPE active.

Further, the channel change activity on the device in question or any device in a home network may be used as a basis for determining whether to change a mode of a device. The information used to determine channel change activity includes time between channel changes, amount of changes within a predetermined time, patterns of behavior with respect to channel changes, etc.

A user or device profile may also be used to determine whether mode changes are appropriate. For example, if a user is classified as often being a channel surfer, mode changes may occur more frequently. Additionally, the subscription level of a user or associated with a device may contribute to a mode change decision; i.e., mode changes may be more readily made for premium level subscribers, thereby ostensibly providing better service due to reduced latency for channel changes. In a related fashion, the subscription level of a given user may also lend information useful in modeling or predicting channel change behavior. For example, a user with basic (non-premium) service which includes access to few or no premium (e.g., on-demand or full length) content delivery mechanisms may more frequently channel-hop, since their programming generally carries a much higher density of commercials and advertisements.

The foregoing information necessary to make the mode change determinations is retrieved in the illustrated embodiment by the mode change application 606 from the metadata database 224. Although the database 224 of FIG. 6 is shown located within the manager entity 214, it is appreciated that the metadata database 224 may comprise a separate entity in communication with the manager 214, and may in fact be remote therefrom.

The mode database 226 of FIG. 6 indicates a current status of each device in the network. The mode database 226 is updated by the mode change application 606 when it is determined that a particular device should be changed from a "stagnant" to "active" mode (or vice versa). As with the metadata database 224, the mode database 226 may be located remote to the manager entity 214, yet in communication therewith.

It is further appreciated that although discussed herein with respect to "stagnant" and "active" states only, the mode database 226 may record other device statuses. In one embodiment, a "sleep" status may be recorded at the database 226, and instituted by the mode change application 606 when a particular device has fallen well below the standard for placing the device in stagnant mode. For instance, if the mode change application 606 generally places devices in stagnant mode after X amount of time without a channel change request, then after e.g., 2× amount of time (twice the nominal stagnant time period), the device is placed in a sleep mode, wherein all content provided to the device is provided in lower resolution and/or quality. Such lack of channel change activity may correlate e.g., to the user having left their premises without turning the CPE/TV off, having fallen asleep while watching the TV, having turned the TV off yet not turned their CPE/receiver off, and so forth; hence, the lower resolution or quality delivered will make no difference to user experience.

In another embodiment, a "hyper-active" status may be identified by the mode change application 606, and recorded in the mode database 226. The hyper-active status indicates that a particular device has a pattern of switching often between two or more programs. For example, during the commercials of one program stream, the viewer flips to the other, and back-and-forth accordingly. In this instance, it may be more efficient to provide the two or more programs as "always on" (i.e., full-quality and resolution) to the device as opposed to constantly switching around the background streams.

The background determination application 608 running on the manager entity 214 is used in the illustrated embodiment for making determinations as to the number and content of the background streams. Information necessary to make such determinations may be retrieved by the application 608 from the metadata database 224.

The favorites list may comprise a dynamically updating list which is able to learn and unlearn user behavior as discussed in co-owned U.S. Patent Application Publication No. 20100251305, previously incorporated herein by reference in its entirety. As discussed therein, the background determination application 608 "learns" from information collected regarding a user's actions and "unlearns" usage behavior by gradually downgrading the importance of certain data as it becomes less relevant.

Additionally, the background determination application 608 may elect to provide additional volume of background content to devices based on patterns of behavior at the device. For example, if a given device is a known "channel surfer", the application 608 may provide more background content to that device as compared to those devices which are not so classified. In a further embodiment, the determination application 608 may preemptively cache certain content as background streams for a particular type of primary or "in focus" content. For example, known popular content (e.g., American Idol), content regarding national news events, holidays, emergencies, etc. may cause a predetermined set of logically, demographically, or psychographically related background content to be preemptively cached with the expectation that users will more likely seek the related content versus anything else. As one example, consider where the national news reports a major snow storm for a portion of the country; cached background content for that area may include The Weather Channel, an emergency alert channel, and the movie "White Christmas".

Other content may also be cached (as determined by the background determination application 608), such as for instance content which is concurrently being recorded by the user or another user in the premises, and/or content which it is known that a user's "friends" are watching. The second example may include apparatus and methods discussed in co-owned U.S. patent application Ser. No. 12/582,653 filed on Oct. 20, 2009 and entitled "METHODS AND APPARATUS FOR ENABLING MEDIA FUNCTIONALITY IN A CONTENT-BASED NETWORK", now U.S. Pat. No. 8,396,055 issued on Mar. 12, 2013, which is incorporated herein by reference in its entirety. As discussed therein, a user may share his/her favorites list with other users or so-called "friends" additionally, the user may enable his/her friends to be made aware of the content which the user is currently tuned (i.e., see what your friends are watching right now). According to this embodiment, the background determination application 608 may cache as background content that content which is currently being provided to a second user (i.e., a friend of the first user). Alternatively, or in addition, the user profile and/or favorites list of the second user may be substituted for that of the first user.

In yet another variant, the determination application 608 may be configured to dynamically begin a process of increasing resolution and quality of certain ones of the background streams based on a user's button presses. Suppose for example, that a user's favorites cached as background content include Channels 052, 112, 154, 220, and 453 of the EPG When the user begins to enter a channel request which begins with a "1", the application 608 can immediately begin to increase the resolution and quality of channels 112 and 154 of the background stream in anticipation that either of these may be selected. If the user continues by entering a second 1, the application 608 can stop increasing resolution and quality of Channel 154, focusing on Channel 112 only.

Gateway Apparatus

Figure 7:
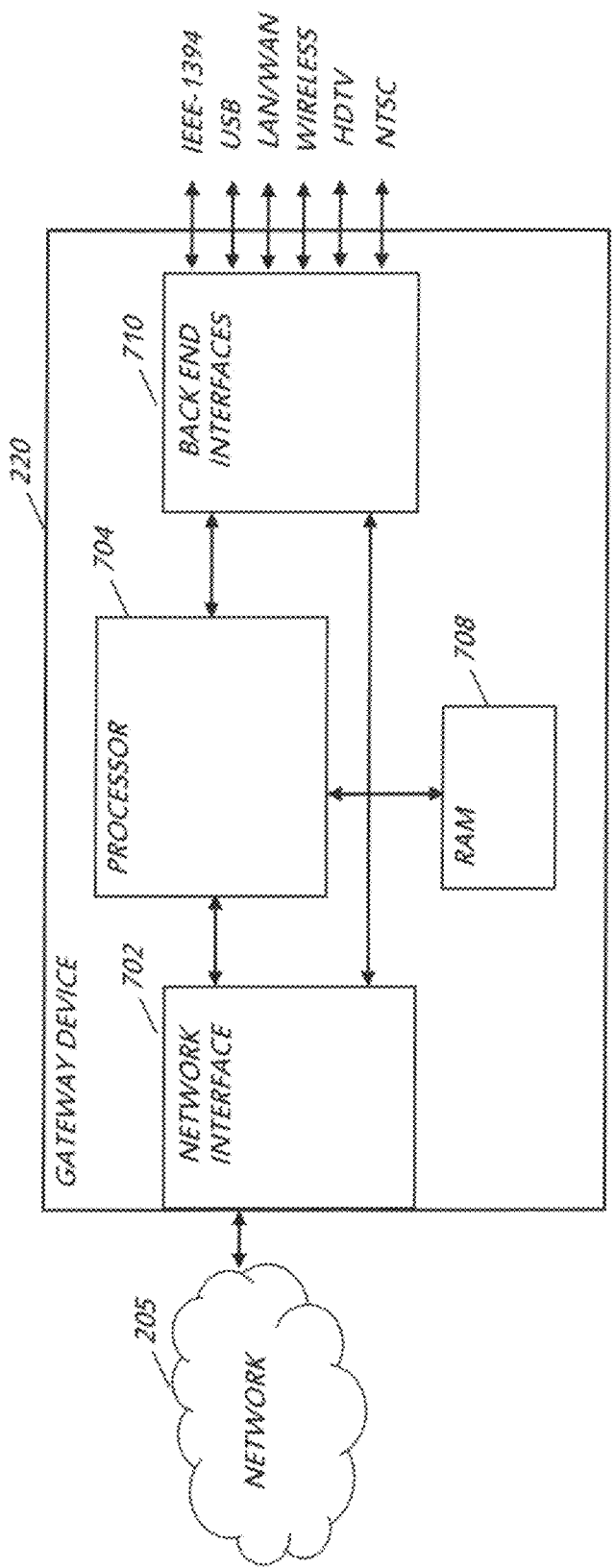
FIG. 7 is a functional block diagram illustrating one embodiment of a gateway apparatus according to the present invention.

FIG. 7 illustrates an exemplary embodiment of a gateway device 220 according to one aspect of the present invention. The gateway 220 may take on any number of forms, including e.g., those with various types of wired and wireless interfaces, indigenous recording capabilities (e.g., DVR or MR-DVR capability), etc. In one exemplary embodiment the gateway 220 is Open IPTV Forum (OIPF) enabled; however, this is in no way a requirement of practicing the invention.

Moreover, it will be recognized that while certain embodiments of the content distribution network of the invention are described as using a gateway (such as those referenced above), the gateway is not an essential component for the delivery of packet-based content over the network according to the invention. For example, in certain variants, an IP-enabled DSTB with a suitable front-end (network) interface for receiving the packetized content may obviate the use of the gateway.

As shown, the exemplary gateway device 220 generally comprises a network interface 702, processor 704 with associated RAM 708, and a plurality of back end interfaces 710. The network interface 702 enables communication between the gateway device 220 and the delivery network 205 (e.g., HFC, HFCu, satellite, optical fiber, etc.). The network interface 702 in one exemplary HFC-based implementation is configured to receive IP content over the DOCSIS QAM (and optionally via standard in-band QAM transport if so equipped as a backup or alternate transport) via an RF tuner, demodulator, etc. Additionally, the network interface 702 may be configured to modulate, encrypt, and multiplex as required, and transmit digital information for receipt by upstream entities such as the CMTS or a network server.

The gateway device 220 may be configured to provide received content to other devices in a user's network (such as via MoCA network, CAT-5 LAN, and/or other wired or wireless topology such as Wi-Fi or PAN). Hence the back end interfaces 408 can include e.g., video/audio interfaces, RJ-45/CAT-5, IEEE-1394 "FireWire", Thunderbolt, USB, serial/parallel ports, DisplayPort, etc.) for interface with other end-user apparatus such as televisions, personal electronics, computers, Wi-Fi or PAN transceivers, or other network hubs/routers, etc. Other components which may be utilized within the device (deleted from FIG. 7 for simplicity) include various processing layers (e.g., DOCSIS MAC or DAVIC OOB channel, MPEG etc.), as well as media processors and other specialized SoC or ASIC devices. The gateway device 220 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The gateway device 220 also optionally includes a MoCA, retail compliant F-connector for providing data-over-coax capability. The exemplary MoCA port operates in the 1125-1525 MHz band, although other frequencies (MoCA compliant or otherwise) may be used for this purpose if desired. The MoCA frequencies can be multi-plexed onto the cable output port of the gateway device 220, or sent over another channel (e.g., dedicated channel or interface). The exemplary MoCA interface (not shown) of the gateway device 220 is compliant with the Media Over Coax Alliance standard v1.0, September 2005, incorporated herein by reference in its entirety. The MoCA interface also supports a minimum of 8 active nodes on the coax network.

The gateway device 220 may also be made compliant with the Digital Living Network Alliance (DLNA) requirements version 1.5, which is incorporated herein by reference in its entirety. The gateway device 220 can automatically discover all DLNA-capable clients in communication therewith during boot up or other events. The gateway device 220 can also automatically start a DLNA-compatible media servers at boot using only the aforementioned MoCA, wireline, and/or Wi-Fi network interfaces.

Still further, the gateway device 220 may utilize the HomePlug A/V standard which transmits digital data over power lines in order to communicate with other devices in the user's premises.

The processor 704 is configured to run one or more applications (not shown) for providing there herein disclosed functionality. The processor 704 of the gateway device 220 may be further configured to run additional applications including those useful in determining a user's authority to view requested client. In one embodiment, the methods and apparatus disclosed in co-owned, co-pending U.S. Patent Application Publication No. 20100131973 filed on Aug. 6, 2009 and entitled "SYSTEM AND METHOD FOR MANAGING ENTITLEMENTS TO DATA OVER A NETWORK" may be utilized to provide the aforementioned functionality. Specifically, as discussed therein, a request for content is received from a client device at e.g., the processor 704 of the gateway device 220. The processor 704 obtains information identifying the user account (such as subscriber identification number, account number, etc.) and uses this information to request entitlements from an entitlements server (not shown) located elsewhere at the headend. Based on the results returned from the entitlements server, the processor 704 will either grant or deny the request. The entitlements server accesses subscription information in a subscriber and device database to obtain sufficient information to determine the entitlements of the subscriber (which may also be used to access information in the aforementioned database(s) of FIG. 6 regarding user subscription level, preferences, historical behavior, etc.).

In yet another embodiment, the gateway device 220 may be configured to transmit and/or receive data via WiMAX transport. In the context of the present invention for example, the gateway 220 might transmit content to connected CPE 222 via another connection (e.g., 1394, USB, MoCA, etc.), yet receive the requested content via a WIMAX broadband interface. Alternatively, the WiMAX interface could be used to transmit the requested content to the CPE 222 directly. Various permutations of the foregoing will be recognized by those of ordinary skill given the present disclosure.

In yet another embodiment, the gateway device 220 may be (or incorporate therein) converged premises device (CPD) functionality, such as that described in co-owned U.S. Patent Application Publication No. 20070217436 entitled "METHODS AND APPARATUS FOR CENTRALIZED CONTENT AND DATA DELIVERY" filed Mar. 16, 2006, now U.S. Pat. No. 8,347,341 issued on Jan. 1, 2013, and incorporated herein by reference in its entirety. As discussed therein, the CPD functionality may be leveraged at the gateway device to provide centralized storage of content (such as content stored at other devices in the premises). The gateway device may further comprise DRM termination functionality as well as DTCP protection.

The gateway 220 may further comply with Digital Living Network Alliance (DLNA) standards. In the present invention, however, the gateway device may utilize DLNA standards for passing metadata to client devices (such as for passing parental control, EPG/guide data, ratings information, etc.). Such functionality may be useful for ensuring, for example, that parental controls are maintained on stored content within a premises. In one embodiment, the foregoing metadata processing and passing functions may be enabled via one or more extensions to the basic DLNA standards.

As noted above, the aforementioned functionality may alternatively be encompassed in the CPE 222 devices themselves.

Many other approaches and combinations of various operational and business paradigms are envisaged consistent with the invention, as will be recognized by those of ordinary skill when provided this disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A computerized method of providing reduced channel changing latency in a content delivery network, said computerized method comprising:
   accessing first data, said first data related to a status of a computerized client device in said content delivery network;
   based at least on said first data indicating that said computerized client device has a first status, accessing second data, said second data related to a profile associated with said computerized client device;

utilizing said second data to select, via a software process, one or more of a plurality of digitally rendered content elements for caching and accessible for delivery to said computerized client device;

causing caching of said one or more of said plurality of digitally rendered content elements; and based at least one a criterion for inactivity of said computerized client device being met, ceasing said caching of said one or more of said plurality of digitally rendered content elements, said at least one criterion for inactivity determined in part by a variable time interval, said variable time interval based at least on one or more patterns of behavior associated with said computerized client device, such that threshold periods of consistent activity cause a delay before said ceasing of said caching, and threshold periods of consistent inactivity cause said ceasing of said caching to occur with no delay.

2. The computerized method of claim 1, further comprising:

receiving from said computerized client device data representative of a request for at least one digitally rendered content element;

determining whether said requested at least one digitally rendered content element is among said cached one or more of said plurality of digitally rendered content elements; and based at least on said requested at least one digitally rendered content element not being among said cached one or more of said plurality of digitally rendered content elements, updating said second data related to said profile, said updated second data utilized for caching said requested at least one digitally rendered content element.

3. The computerized method of claim 1, wherein:

said ceasing of said caching is based on changing said first status of said computerized client device to a second status with said delay;

said changing said first status of said computerized client device to said second status with said delay is based at least in part on a time interval during which said computerized client device has been associated with said first status exceeds one of the threshold periods of the consistent activity;

said first status comprises an active mode and said second status comprises a stagnant mode.

4. The computerized method of claim 1, wherein:

said first status comprises an active status and is based at least on a powering-up of said computerized client device;

said causing caching of said one or more of said plurality of digitally rendered content elements comprises causing caching of said one or more of said plurality of digitally rendered content elements at a reduced level of digital resolution quality; and said computerized method further comprises:

receiving third data indicative of a channel change by said computerized client device;

increasing a quality of said selected one or more of said plurality of digitally rendered content elements within a prescribed period of time after said third data indicative of said channel change is received; and providing said one or more of said plurality of digitally rendered content elements with increased quality to said computerized client device.

5. The computerized method of claim 1, wherein said profile associated with said computerized client device comprises a profile of at least one user associated with the computerized client device, the profile comprising data representative of one or more demographic or psychographic aspects of the at least one user.

6. The computerized method of claim 1, wherein said profile associated with said computerized client device comprises data relating to at least historical tuning or channel-change activity by the computerized client device.

7. Computer readable apparatus comprising a non-transitory storage medium, the non-transitory medium comprising at least one computer program having a plurality of instructions, the plurality of instructions configured to, when executed on a processing apparatus:

assign a first status to a computerized client device, wherein the first status requires that a threshold period of inactivity by the computerized client device be met before the first status is changed to a second status;

access first data relating to a pattern of behavior associated with the computerized client device;

based on the first data, employ a rule, wherein the rule requires an extended period of inactivity by the computerized client device be met before the first status is changed to the second status, the extended period of inactivity being greater than the threshold period of inactivity; and based at least on the computerized client device having the first status:

(i) access second data, the second data related to a profile associated with the computerized client device; and (ii) utilize the second data to select one or more of a plurality of digitally rendered content for caching and delivery to the computerized client device;

wherein the second status is configured to cause the caching to stop.

8. The computer readable apparatus of claim 7, wherein the plurality of instructions are further configured to, when executed on the processing apparatus:

store data related to one or more learned contexts, the one or more learned contexts comprising certain periods of time within which the computerized client device renders a certain type of digitally rendered content, and wherein the selection of the one or more of the plurality of digitally rendered content for caching is based at least on the stored data related to the one or more learned contexts.

9. The computer readable apparatus of claim 7, wherein the plurality of instructions are further configured to, when executed on the processing apparatus:

cause caching of the selected one or more of the plurality of digitally rendered content;

based on the extended period of time being met or exceeded, cause a change of the first status of the computerized client device to the second status, the second status indicative that the computerized client device is subject to less channel changing activity relative to the first status, the change based on at least historic data; and cause a cessation of the caching of the selected one or more of the plurality of digitally rendered content based at least on the change to the second status.

10. A computerized apparatus for provision of reduced channel changing latency in a content distribution network, the computerized apparatus comprising:
- at least one network data interface;
- a storage entity; and
- a processor apparatus in data communication with the at least one network data interface and the storage entity, the processor apparatus configured to execute at least one computer program thereon, the computer program comprising a plurality of instructions which are configured to, when executed by the processor apparatus:
  - access first data relating to a policy, wherein the policy requires a threshold period of time before switching the status associated with a computerized user device from a first status to a second status;
  - access second data, the second data comprising data relating to one or more particular historical patterns of behavior associated with the computerized user device;
  - based at least on the second data, reconfigure the first data, wherein the reconfiguration of the first data implements a change to the policy which requires a greater period of time than the threshold period of time before switching the status of the computerized user device from the first status to the second status.

11. The computerized apparatus of claim 10, wherein the plurality of instructions are further configured to, when executed:
- detect a function selection indicative of a request by the computerized user device to change from causing rendering of a first digitally rendered program to causing rendering of a second digitally rendered program; and
- cache at least a portion of the first digitally rendered program, the cache triggered by the detection.

12. The computerized apparatus of claim 11, wherein the plurality of instructions are further configured to, when executed:
- receive third data relating to one or more other function selections indicative of one or more respective requests by the computerized user device, the receipt based at least in part on the request to change from causing rendering of the first digitally rendered program to the second digitally rendered program; and
- utilize the third data to select an additional one or more digitally rendered content programs for caching.

13. The computerized apparatus of claim 10, wherein the plurality of instructions are further configured to, when executed:
- based at least on the computerized user device having the first status, access data relating to a profile associated with the computerized user device; and
- utilize the accessed data relating to the profile to select one or more digitally rendered content elements for caching for the computerized user device; and
- wherein: (i) the policy requires that a first delay be imposed before causing ceasing of the caching, and (ii) the reconfigured first data implements a policy change that requires an extended delay be imposed before the causing of the ceasing of the caching, the extended delay comprising a delay greater that the first delay.

14. The computerized apparatus of claim 13, wherein the data relating to the profile comprises data configured to enable a determination of whether the computerized user device is entitled to receive the one or more of the plurality of digitally rendered content, the data relating to a subscription level or account of a user with which the computerized user device is associated.

15. The computerized apparatus of claim 13, wherein the plurality of instructions are further configured to, when executed:
- update the data relating to the profile, the update comprising a discard of data relating to usage behavior associated with the computerized user device, the discard occurring via a progressive downgrade of an importance of certain of the data as the certain data becomes less relevant.

16. The computerized apparatus of claim 15, wherein the update of the data relating to the profile further comprises utilization of the one or more historical patterns of behavior associated with the computerized user device, the one or more historical patterns of behavior associated with respective one or more genres of digitally rendered content.

17. The computerized apparatus of claim 13, wherein the one or more digitally rendered content elements are included with a data structure generated specifically for the computerized user device, the data structure populated based at least on (i) data indicative of one or more preferences associated with the computerized user device, and (ii) data indicative of past channel change activity by the computerized user device.

18. The computerized apparatus of claim 10, wherein the first status comprises an active status, the active status based at least one a detected level of activity at the computerized user device, the detected level of activity correlated to a higher likelihood that a channel change event will occur than a likelihood of such channel change event occurring without the detected level of activity.

19. The computerized apparatus of claim 10, wherein:
- the first status indicates that the computerized user device is associated with a pattern of switching, at a frequency greater than a prescribed frequency, between two or more digitally rendered programs; and
- the plurality of instructions are further configured to, when executed:
- select the two or more digitally rendered programs for caching.

20. The computerized apparatus of claim 10, wherein the plurality of instructions are further configured to, when executed by the processor apparatus:
- speculatively assign an initial status to the computerized user device based on information related to a digitally rendered program stream then-currently being delivered to the computerized user device.

21. The computerized apparatus of claim 20, wherein the information related to the digitally rendered program stream comprises a plurality of indicators within the digitally rendered program stream, each of the indicators indicative of a start of an advertisement.

22. The computerized apparatus of claim 20, wherein the speculative assignment of the initial status to the computerized user device is further based on at least one of the one or more historical patterns of behavior associated with the computerized user device, the at least one historical pattern of behavior comprising data indicative that the computerized user device is not prone to channel changes during a commercial break.

* * * * *